Oct. 8, 1968  YOSHIO AKITA ETAL  3,404,500
SEGMENTED METAL LINED LIQUID STORING UNDERGROUND TANK
Filed May 26, 1966  2 Sheets-Sheet 1
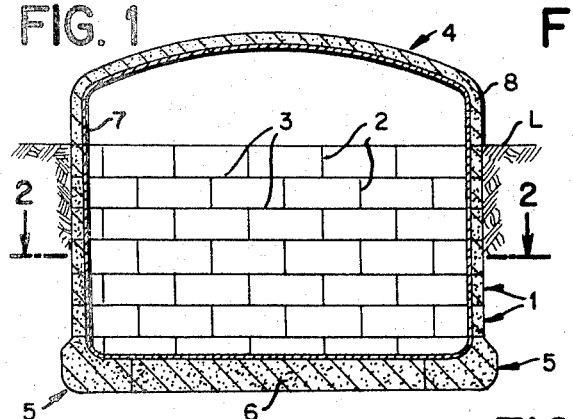
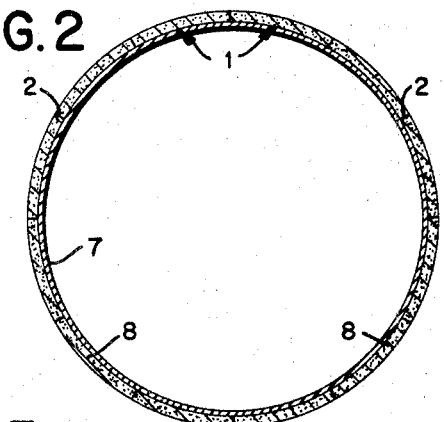
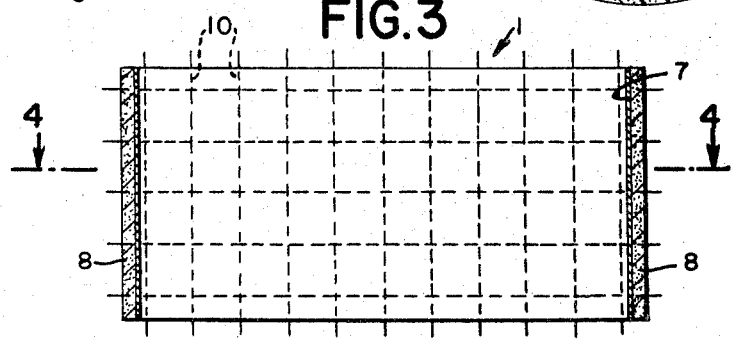
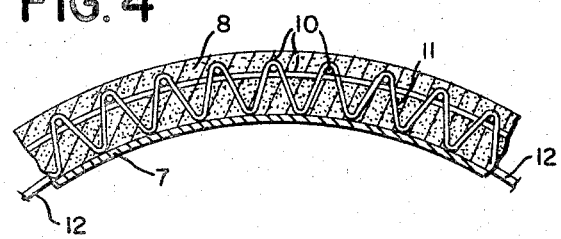
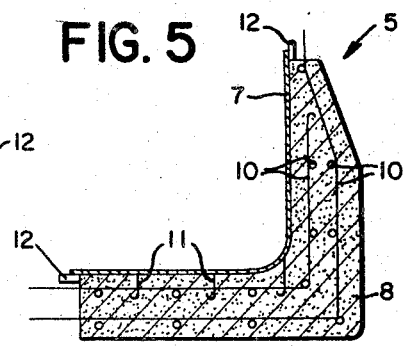
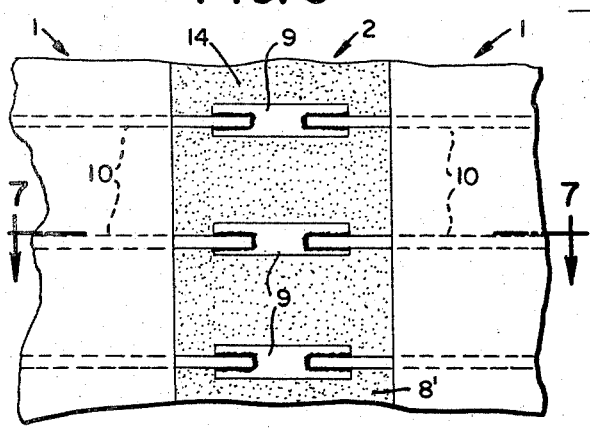
INVENTORS
YOSHIO AKITA et al
BY
Nolte & Nolte
ATTORNEYS Oct. 8, 1968  YOSHIO AKITA ETAL  3,404,500
SEGMENTED METAL LINED LIQUID STORING UNDERGROUND TANK
Filed May 26, 1966  2 Sheets-Sheet 2

INVENTORS
YOSHIO AKITA et al
BY
*Nolte & Nolte*
ATTORNEYS

United States Patent Office 3,404,500
Patented Oct. 8, 1968

3,404,500
SEGMENTED METAL LINED LIQUID STORING UNDERGROUND TANK
Yoshio Akita and Toyoo Maeda, Tokyo-to, and Toshio Yada, Funabashi-shi, Japan, assignors to Ishikawajima-Harima Jukogyo Kabushiki Kaisha, Tokyo-to, Japan, a Japanese company
Filed May 26, 1966, Ser. No. 553,165
Claims priority, application Japan, June 3, 1965, 40/32,860
8 Claims. (Cl. 52—249)

ABSTRACT OF THE DISCLOSURE

A liquid storage underground tank is constructed from a plurality of prefabricated construction segments. Each segment includes an inner metal shell, reinforcing rods, shear connectors and filling material, such as concrete. To form the completed tank, the rods of adjacent segments are secured together to thereby join adjacent segments.

---

The present invention relates to an underground tank for storing liquid (simply referred to as tank hereafter) constructed with composite shell segments (referred to as segment hereafter).

A conventional tank having general reinforced-concrete structure is lined with steel sheets, for example, on its inner surface in order to provide the tank with sufficient strength for bearing ground pressure and earthquakes and prevent the leakage of liquid. As the capacity of a tank increases the reinforced-concrete side walls must also increase in thickness. At the same time, since the inner plankings must increase with the capacity, the construction cost will come up to an enormous amount. Besides, on account of the fact that plankings and reinforced-concrete are prepared independently in an ordinary case, there arise various kinds of problems such as difficulty in joining of the plankings and reinforced-concrete, probability of the leakage of the liquid, and lack of reliability on the whole construction works and on the function of the tank, because the construction works is carried out at the construction field.

The purpose of the present invention is to solve these problems.

Figure 7:
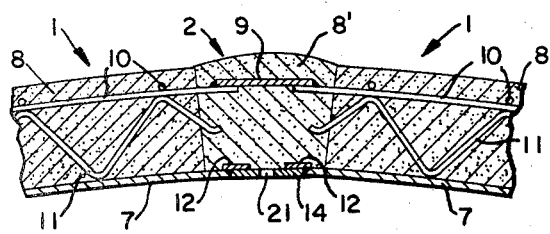
Figure 8:
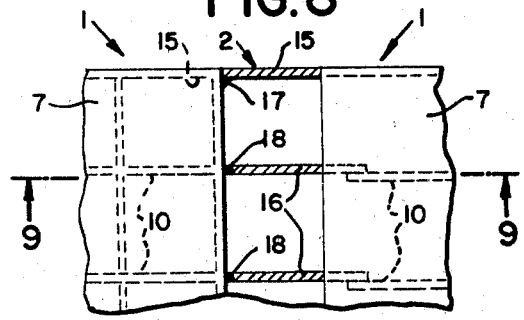
Figure 9:
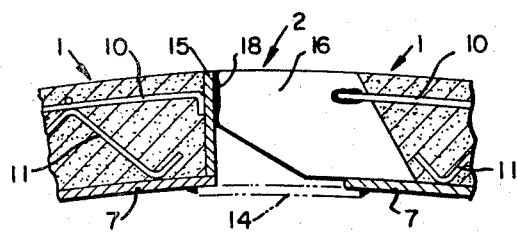
Figure 10:
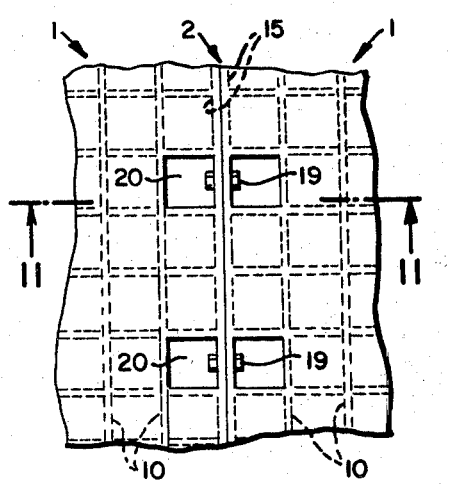
Figure 11:
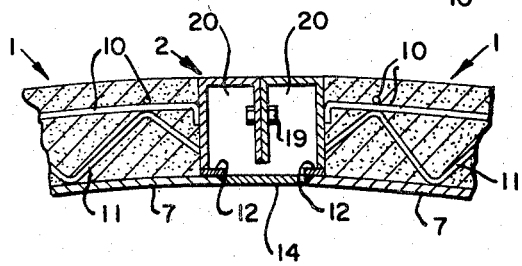

FIG. 1 is longitudinal section showing the embodiment according to the present invention, FIG. 2 the cross section along A—A line in FIG. 1, FIG. 3 an elevation plan showing the side segment, FIG. 4 the cross section along B—B line in FIG. 3, FIG. 5 the longitudinal section showing the corner segment, FIG. 6 the front view illustrating the joining method, FIG. 7 the cross section along C—C line in FIG. 6, FIG. 8 an elevation plan showing another embodiment of the joining method, FIG. 9 the cross-sectional view along D—D line in FIG. 8, FIG. 10 an elevation plan illustrating another emodiment of the joining method, and FIG. 11 the cross section along E—E line in FIG. 10.

FIG. 1 shows an embodiment of the tank according to the present invention constructed partially underground, where 1 refers to the side segment composed with a shell 7 made of steel sheets on its inner surface and a shear-connecter and reinforced-concrete on its outer surface, 2 to joints in longitudinal direction, 3 to joints in transverse direction, 4 to the ceiling, 5 to a corner segment, 6 to the base, L to the ground. The tank is constructed in the following way. The side segments 1 and corner segments 5 arranged in annulation in the excavated space of the ground L where the tank is to be laid are first joined through the joining method which is described in the following, then the base 6 and the ceiling 4 are joined to the former.

It should be understood that the ceiling part and the base part can take the known conventional structure.

FIG. 3 and FIG. 4 show side segments. The shear-connecter 11 is welded to the outer surface of the steel shell 7, with reinforced steel bars 10 being arranged crosswise, and these are composed to a unity by means of concrete 8 as filling material. The shell serves both as lining material for the prevention of the leakage of the liquid and as a tank reinforcing material.

FIG. 5 shows an example of the corner segment, where 7 refers to a shell, 11 to a shear-connector, 10 to steel bars, and 8 to concrete. This segment is of the shape corresponding to the base corner of the tank. Since this segment receives greater loads than others the steel bars 10 and the shear-connector 11 have greater diameters here than elsewhere and concrete 8 has greater thickness also.

In FIG. 4 and FIG. 5, 12 refers to backing steel sheets. Both the side segments and the corner segment have their side bars projected outwardly in both longitudinal and transverse direction, with the shell 7 given edge preparation.

Such side segments 1 and corner segments 5 described above are produced in a factory in mass production.

Here is the explanation of the method for joining the segments at the construction field.

FIG. 6 and FIG. 7 show an example of the method for joining adjacent side segments 1 at the joint 2. In this case the steel bars 10 of the two adjacent segments are applied with flat steel bar 9 by means of welding or other measure in order to join them, then, after the joined part 8′ is concreted, steel sheets 14 are applied to the backing plates 12 in the shell 7 of the two segments in order to render one-side butt-welding. Or, as is shown in the drawings at FIG. 7, a grouting hole 21 may be opened in the steel sheet 14 in advance so that after the flat steel bar and the steel sheets 14 have been welded with each other mortar or other fillers can be poured into by means of pressure, then said grouting hole 21 is to be closed at last.

In the embodiment shown in FIG. 8 and FIG. 9 two opposite sides of side segments are welded with flanges 15 and the other sides with brackets 16 in advance and, at the construction field, they are conjectionally welded at welding parts 17, 18 as is shown in the drawings, for instance, the part of the shell being bound with a steel plate 14; in this case grouting holes into the joint section 2 may be omitted.

Another embodiment shown in FIG. 10 and FIG. 11 have flanges 15 and joints 20 on the two adjacent segments arranged as shown in the drawings after said segments are joined through a bolt 19, the sheil is welded wi h steel plates 14.

It should be taken as granted that any kind of known joints can replace the coup.ing part 20 in this embodiment.

So far the explanation of the longitudinal joining method in the joint sec.ions 2 in FIG. 1 with reference to three embodiments. Joint sections 3 (cf. FIG. 1) in transverse direction can be joined in the similar way to the above-described method, and so with the joining of corner segments 5.

Thus the present invention realizes the following advantages:

(1) Since the shell of segments serves for the purpose of preventing the leakage of the contained liquid and strengthening the tank at the same time, the concrete wall can be thinner in comparison with the conventional tanks constructed by reinforced-concrete only.

(2) Since the shell is composed with concrete in unification the tank is free of destruction or exfoliation of the heat insulating material even when negative pressure relative to the outer pressure is originated in the tank.

(3) Since the segments are arranged in annulation the tank has a great resistance against the pressure from without so that it requires no reinforcing material in construction.

(4) Since the required type of the segments are produced in a factory homogeniety and accuracy of the dimension of the segments can be maintained and mass production at a low cost is possible.

(5) Since the tank can be constructed in a short period of time with simple technique at the construction field, the cost of construction can be cut down relatively to the conventional case.

(6) Confidence in the tank increases by an extreme degree.

What we claim is:

1. A liquid storage tank substantially in the form of a vertical cylinder comprising; a plurality of prefabricated annular construction segments each of said segments comprising; filling material, an annular inner metal shell, a shear connector secured at one end thereof to said shell, reinforcing bars extending transversely and longitudinally in and extending beyond said filler material, means for joining said segments both longitudinally and transversely including means for joining the ends of the bars of adjacent ones of said segments, to thereby form said storage tank.

2. The storage tank as claimed in claim 1 wherein said joining means comprise a flange secured at one side of said segment and a bracket secured to said flange and to the end of the bar of the adjacent one of said segments.

3. The storage tank as claimed in claim 1, wherein said joining means comprise a flange means secured to opposing faces of adjacent segments, and means for fastening said flange means to one another.

4. The storage tank as claimed in claim 1 wherein said filling material is concrete.

5. The storage tank as claimed in claim 1 wherein said joining means comprise a metal strip secured to adjacent ends of said bars.

6. The storage tank as claimed in claim 5 further comprising a backing plate secured to said shell extending transversely and longitudinally from said segments, said joining means further comprising a sheet applied to adjacent ends of said metal shell.

7. The storage tank as claimed in claim 6 wherein additional filler material is added to between adjacent ones of said joined segments.

8. The storage tank as claimed in claim 7, wherein said sheet is provided with a hole and said additional filler material is poured through said hole.

References Cited

UNITED STATES PATENTS

| | | | |
|---|---|---|---|
| 528,399 | 10/1894 | Stebbins | 52—249 |
| 602,454 | 4/1898 | Kelly | 52—249 |
| 1,189,694 | 7/1916 | Janssen et al. | 52—245 |
| 1,898,668 | 2/1933 | Jones et al. | 52—648 |
| 1,970,940 | 8/1934 | Laube | 52—378 |
| 2,331,140 | 10/1943 | Schmidt | 52—378 |
| 2,558,580 | 6/1951 | Pomykala | 52—224 |
| 3,140,515 | 7/1964 | Dosker | 52—573 |
| 3,151,416 | 10/1964 | Eakin et al. | 52—249 |
| 3,245,179 | 4/1966 | Hawkins | 52—268 |
| 3,280,525 | 10/1966 | Crowley | 52—224 |

FOREIGN PATENTS 411,772 6/1945 Italy.

HENRY C. SUTHERLAND, *Primary Examiner.*

JAMES L. RIDGILL, *Assistant Examiner.*